H. C. FISK.
Grinder for Reaper Teeth

No. 120,258. Patented Oct. 24, 1871.

Witnesses
T. B. Curtis
J. M. Hyne

Inventor
Henry C. Fisk
Chipman Fosmer & Co
attys

UNITED STATES PATENT OFFICE.

HENRY C. FISK, OF WELLSVILLE, NEW YORK.

IMPROVEMENT IN HAND-GRINDERS FOR HARVESTER-CUTTERS.

Specification forming part of Letters Patent No. 120,258, dated October 24, 1871.

*To all whom it may concern:*

Be it known that I, HENRY C. FISK, of Wellsville, in the county of Alleghany and State of New York, have invented a new and valuable Improvement in Mower-Grinder, &c.; and I do hereby declare that the following is a full, clear, and exact description of the construction and operation of the same, reference being had to the annexed drawing making a part of this specification, and to the letters and figures of reference marked thereon.

Figure 1:
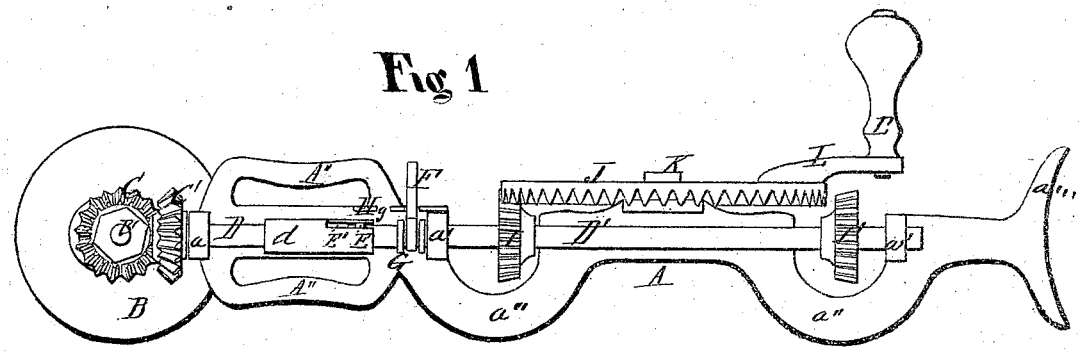
Figure 2:
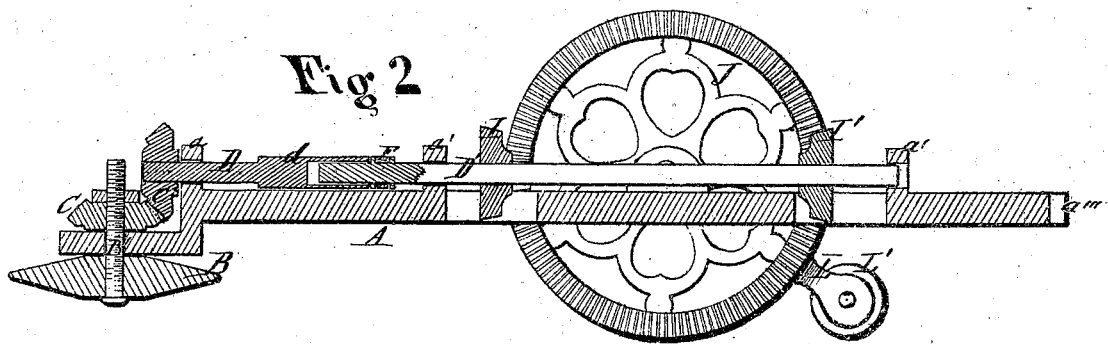

Figure 1 of the drawing is a representation of a side view of my invention. Fig. 2 is a longitudinal vertical section of the same.

This invention has relation to grinders for sharpening the cutting-teeth of mowing or reaping-machines; and is designed as an improvement on the subject of a patent granted to me March 7, 1871. Said improvement consists in the application and novel arrangement of devices by means of which the emery-wheel or stone may be rotated in either direction by turning the spur-wheel one way; also, in the construction and novel arrangement of a hand-piece by which to firmly hold the instrument when in use.

In the accompanying drawing, illustrating this invention, A represents the frame of the grinder; B, the beveled emery or stone-wheel journaled to the bracket $b$, formed on the forward end of the frame A; C C', bevel gear-wheels fixed, respectively, on the shaft B' of the wheel B and the main shaft D, and engaging with one another. The main shaft is made in two pieces, D D', of which D has a tubular end or shoulder-piece, $d$, into which the forward end of the section D' slides and is thereby rendered longitudinally adjustable. A stud, E, projecting from the section D into a slot, E', cut in the shoulder-piece $d$, serves as a coupling in order that the two sections of the shaft may turn together in the same direction. The adjustable section D' is held at the desired point to which it may be adjusted by means of a latch-bar, F, hung on the flanged wrist G, and adapted to engage with or fall into the spaces $g$ of a notched flange, H. The object in having the section D' adjustable, as described, is to alternately throw the pinions I I' into gear with the large spur-wheel J, said pinions being secured to the section D', facing each other from opposite sides of the spur-wheel J, which is journaled to the side of the frame A on a transverse or laterally projecting bearing, K. The direction in which the wheel B is rotated is governed by the pinions I I', according as the one or the other is brought into contact with the wheel J, the latter being intended to turn in the direction which is found the more convenient. L designates a crank with handle L' for operating the wheel J. $a$ $a'$ represent lugs or boxes formed on the frame A, as bearings for the shaft D D'. $a''$ are bends made in the frame A so as to leave space for the rotation and longitudinal adjustment of the pinions I I'. $a'''$ indicates the breast-piece formed on the rear end of said frame; A'', loop handles on either side of said frame, between the position of the latch-bar F and bevel-wheel C'. These handles are intended as guards for the shaft, and devices by which the instrument may be firmly held while a true even edge is given to the tooth of the mower or reaper.

The importance of the peculiar arrangement of these handles or guards is greater than may at first appear. The instrument grinds the edges of the teeth very rapidly, and, consequently, a slight accidental variation in the incline or direct progress of the grinding-wheel is apt to injure their edges; hence the necessity of holding the instrument firmly at its forward end, and in such a manner that material lateral movement toward either side may be prevented. The desired end is obviously well obtained by the devices herein specified for that purpose.

I claim as my invention—

1. The shaft, consisting of the section D and adjustable section D', in combination with the pinion I I', spur-wheel J, latch-bar or equivalent F, and grinding-wheel B, substantially as described.

2. The construction and arrangement of the loop-handles A'', having their grasp parallel with the main bar, substantially as and for the purpose set forth.

In testimony that I claim the above I have hereunto subscribed my name in the presence of two witnesses.

HENRY C. FISK.

Witnesses:
WM. ARMSTRONG,
B. C. RUDE.

(74)